US008282466B2

(12) United States Patent
Hornik et al.

(10) Patent No.: US 8,282,466 B2
(45) Date of Patent: Oct. 9, 2012

(54) WAGERING GAME WITH HIGH-PAYOUT PERCENTAGE GAMING FEATURE

(75) Inventors: Jeremy M. Hornik, Chicago, IL (US); Dion K. Aoki, Henderson, NV (US); Joel R. Jaffe, Evanston, IL (US); James J. Poole, Chalfont St. Giles (GB)

(73) Assignee: WMS Gaming Inc., Waukegan, IL (US)

( * ) Notice: Subject to any disclaimer, the term of this patent is extended or adjusted under 35 U.S.C. 154(b) by 2359 days.

(21) Appl. No.: 11/027,061

(22) Filed: Dec. 30, 2004

(65) Prior Publication Data

US 2006/0148548 A1 Jul. 6, 2006

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................... 463/25; 463/16; 463/20

(58) Field of Classification Search .............. 463/16–20, 463/25

See application file for complete search history.

(56) References Cited

U.S. PATENT DOCUMENTS

| | | | | |
|---|---|---|---|---|
| 5,380,008 | A * | 1/1995 | Mathis et al. | 463/18 |
| 6,203,429 | B1 | 3/2001 | Demar et al. | 463/20 |
| 6,312,334 | B1 * | 11/2001 | Yoseloff | 463/25 |
| 2003/0054873 | A1 * | 3/2003 | Peterson | 463/20 |

* cited by examiner

*Primary Examiner* — Melba Bumgarner
*Assistant Examiner* — Jason Pinheiro
(74) *Attorney, Agent, or Firm* — Nixon Peabody LLP

(57) ABSTRACT

A wagering game system is provided and includes a gaming system for playing a wagering game, including an input device adapted to receive an input from a player of the wagering game, a processor configured to determine a wagering game outcome, and a gambling feature incorporating a game in which a player is statistically more likely to win than to lose, wherein the gambling feature is enabled by a wagering game outcome that includes a winning combination.

25 Claims, 5 Drawing Sheets

WAGERING GAME WITH HIGH-PAYOUT PERCENTAGE GAMING FEATURE

TECHNICAL FIELD

The present disclosure relates generally to wagering games and, more particularly, to a wagering game with a high-payout percentage gaming feature.

BACKGROUND

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, gaming terminal operators strive to employ the most entertaining and exciting terminals available because such terminals attract frequent play and, hence, increase profitability for the operators. Thus, in the highly competitive gaming terminal industry, there is a continuing need to develop new types of games, or improvements to existing games, that will enhance the entertainment value and excitement associated with the games.

One concept that has been successfully employed in existing gaming terminals to enhance player entertainment is the use of a secondary or "bonus" game which may be played in conjunction with a "basic" game. The bonus game may include any type of game, either similar to or entirely different from the basic game, initiated by the occurrence of certain pre-selected events or outcomes of the basic game. Such a bonus game has been found to produce a significantly higher level of player excitement than the basic game alone because it provides an additional chance to play, which increases the player's overall expectation of winning. Moreover, bonus games often provide a greater expectation of winning than the basic game alone. According to one type of bonus game, a plurality of player-selectable symbols or windows are provided and the selection of which reveals a bonus-credit award that is initially covered by the symbol. The player continues to make selections and accumulate awards until an end-bonus outcome is uncovered. Thus, if a player initially selects a symbol covering the end-bonus outcome, the player receives no bonus award. This selection-type game, wherein a selection may award credits or end the game, is generally considered to have a high volatility index. "Volatility index" is a mathematical value that is the industry standard for measuring distribution of sizes and probabilities of slot machine payoffs and is described in further detail in U.S. Pat. No. 6,302,791, which is incorporated herein by reference in its entirety. For example, standard slot machines have a relatively steady payoff progression and, thus, are considered to have low volatility indices, which means that there is a relatively steady progression of many payoff values from the lowest to the highest, with each payoff corresponding probability decreasing as the value of the payoff increases. On the other hand, the described selection-type bonus game has a high volatility index. "Expected value" ("EV") is another mathematical value used in the industry to describe the probability-weighted average of all possible outcomes of a chance event or, stated differently, the EV may be defined as the percentage of the total wager that the machine will pay out over the cycle of the game, where the cycle is defined to be the set of all possible outcomes. In one respect, the volatility is used to refer to the standard deviation of the distribution of possible values about the expected value.

Some conventional gaming terminals provide gaming features that provide a better than average chance of winning, but fail to exceed a potential 100% payout (i.e., a 50/50 chance of the player or the house winning on a particular play).

The gaming experience may be advantageously enhanced by selective manipulation of the volatility and expected value to provide increased excitement and entertainment value over existing gaming terminals.

SUMMARY

The present concepts are directed to a wagering game system and method and more particularly a wagering game system and method employing a gambling feature with a high-payout percentage multiplier. This high-payout percentage multiplying feature may be incorporated into any game and pays out better than 100% (e.g., 100+%, 100.5%, 101%, etc.) in certain aspects of game play. Thus, the player can expect to benefit from the gambling feature to a greater extent than conventional bonus games or gambling features which provide, at best, an even return or parity between the player and house. The increased pay out of the gambling feature, over 100%, thereby provides an incentive to game play and increases excitement.

In one aspect, a wagering game system is provided and includes a gaming system for playing a wagering game comprising an input device adapted to receive an input from a player of the wagering game and output a signal to a processor, a processor configured to randomly select a wagering game outcome from a plurality of game outcomes, and a gambling feature incorporating a game in which a player is statistically more likely to win than to lose, said gambling feature being enabled in response to said wagering game outcome being a start-gambling feature outcome.

In another aspect, a gaming system for playing a wagering game includes a gaming terminal including a display for displaying a wagering game and a wagering game outcome and a processor associated with the gaming terminal. The processor is configured to, upon execution of a corresponding instruction set, enable a gambling feature in response to a wagering game outcome corresponding to a winning outcome, define a plurality of possible outcomes of the gambling feature, associate a majority of the possible plurality of possible outcomes of the gambling feature with a winning gambling feature, present the gambling feature on the display for player input, and receive an input corresponding to the gambling feature by a player through a gaming terminal input device.

In yet another aspect, a method of playing a wagering game is provided which includes the steps of receiving a wager for a wagering game, determining an outcome of the wagering game, displaying on a display the outcome of the wagering game, and enabling a gambling feature if the game outcome includes a start-gambling feature outcome, wherein the gambling feature comprises a game in which a player is statistically more likely to win than to lose.

In still another aspect, a gaming terminal connected to a network for playing a base wagering game includes at least one display for displaying a base wagering game conducted at the gaming terminal. In response to at least one winning combination at a gaming terminal during a base wagering game, a controller initiates at the gaming terminal a gambling feature game having odds favoring the player of the gaming terminal.

The above summary of the present concepts is not intended to represent each embodiment, or every aspect, of the present concepts, which are set forth by way of example in the accompanying detailed description and figures and which are defined by the claims.

BRIEF DESCRIPTION OF THE DRAWINGS

The following drawings are provided to illustrate various aspects of the concepts detailed herein, wherein.

Figure 1:
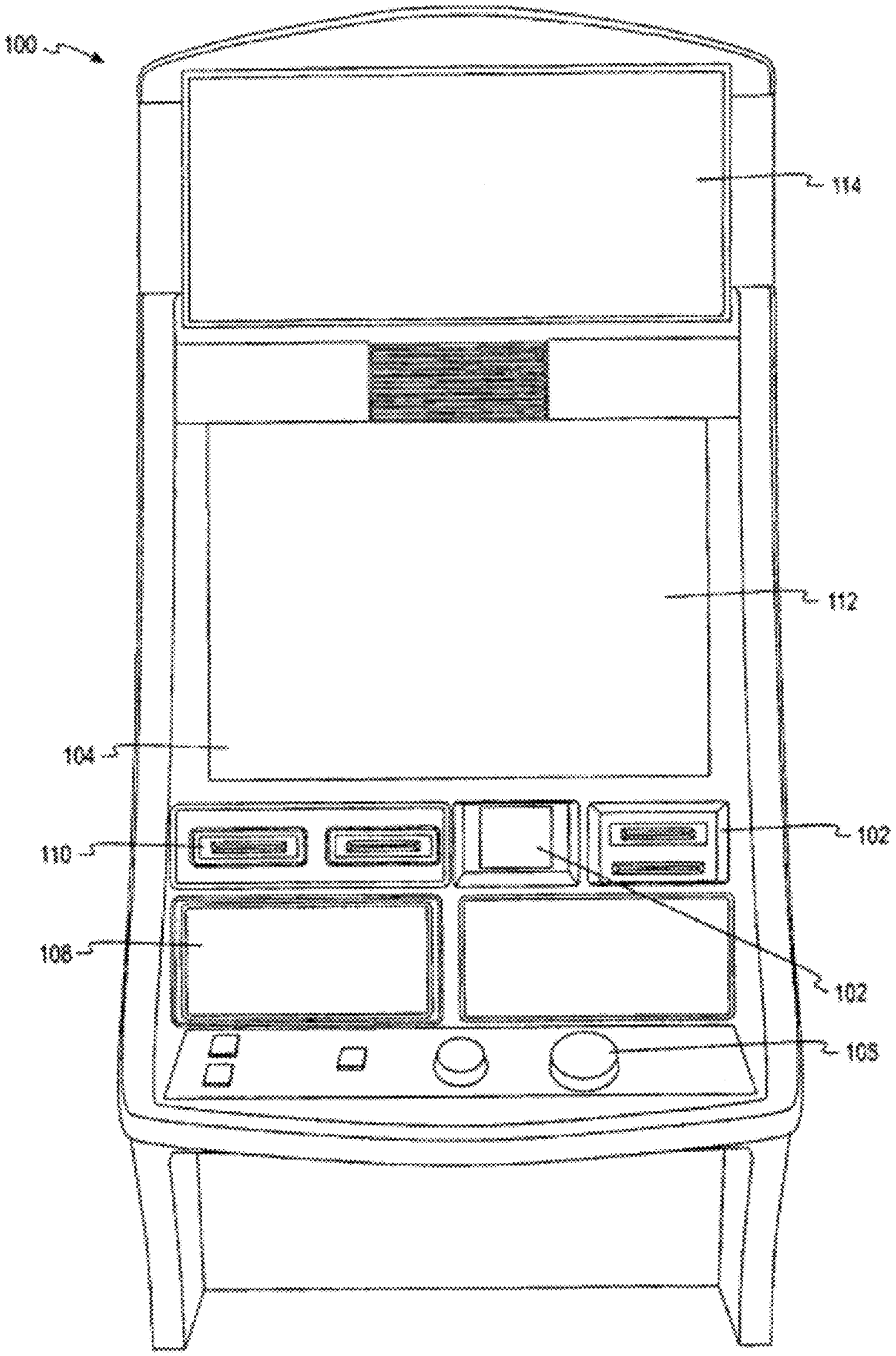
FIG. 1 illustrates a gaming terminal which may be used in accord with the present concepts.

While the present concepts are susceptible to various modifications and alternative forms, specific embodiments have been shown by way of example in the drawings and will be described in detail herein. It should be understood that the present concepts are not intended to be limited to the particular forms disclosed, but are intended to include all modifications, equivalents, and alternatives falling within the spirit and scope of the present concepts disclosed herein.

DETAILED DESCRIPTION

The following examples relate generally to wagering games and, more particularly, to a wagering game with a high-payout percentage gambling feature. This high-payout percentage gambling feature is not a bonus gambling feature, per se, but rather a gambling feature that may be incorporated into any game, including a bonus game, or the like. In general terms, the present concepts provide a gambling feature that would pay out better than 100% (e.g., 100+%, 100.5%, 101%, etc.) in certain aspects of game play over a statistically sufficient time period through balancing of the gambling feature's odds of winning and/or the gambling feature's payout. Thus, the player can expect to benefit from the gambling feature to a greater extent than conventional bonus games, which provide, at best, an even return or parity between the player and house.

FIG. 1 shows a representation of an exemplary gaming terminal 100 according to embodiments of the invention. The gaming terminal 100 may be operated as a stand-alone terminal, or it may be connected to a network of gaming terminals. Further, the gaming terminal 100 may be any type of gaming terminal and may have varying structures and methods of operation. For example, the gaming terminal 100 may be a mechanical gaming terminal configured to play mechanical slots, or it may be an electromechanical or electrical gaming terminal configured to play a video casino game such as, but not limited to, blackjack, slots, keno, and poker, and any other associated games (e.g., bonus games having a board-game theme or video-based game theme). The gaming terminal 100 is typically associated with a basic or base wagering game in which players are awarded a prize (e.g., cash, credits, gifts certificates, etc.) for achieving a winning combination or event. Prizes may also include entry into another game, such as a secondary game, bonus game, or progressive game, which provides further opportunity for an award, used generically herein to refer to any benefit bestowed upon a player regardless of terminology, form (e.g., enhanced odds of attaining an award), and/or amount.

In one aspect, the gaming terminal 100 is a video slot machine comprising conventional gaming terminal components including input devices, such as wager acceptor(s) 102, payout device 108, a main display 112, which may comprise a touch screen display portion 104, push-buttons 106, and an information reader (e.g., player-identification card reader) 110. Push buttons 106 may comprise mechanical push buttons, soft buttons, or buttons integrated with a touch-screen display, and allow players to select various options with respect to the games played on the gaming terminal 100.

The wager acceptor 102 and/or payout device 108 may include any conventional means by which wagers are processed and accepted including but not limited to a card wager acceptor and a currency (i.e., bills, coins, tokens) wager acceptor or any combination thereof. It may comprise, for example, a card wager acceptor including a card-reading device for receiving a stored value card and reading a recorded monetary value associated with the card. The card wager acceptor may also facilitate communication to a remote account, through a controller 210, described below, and a communications system to permit transfer of money from a player's bank credit account, banking account, or room number (e.g., for guests of a casino having pre-authorized credit) to the gaming terminal 100. The wager acceptor 102 and/or payout device 108 may alternatively include a RF reader for reading a RF device encoded with credit and/or monetary information.

The main display 112 displays information about the game being played, such as a basic wagering game or a group game, and may take a variety of forms. For example, the main display 112 may be a conventional 3-slot or 5-slot mechanical reel, or it may take the form of a cathode ray tube (CRT), a liquid crystal display (LCD), a plasma display, or any other type of display that is suitable for displaying images, such as simulated mechanical reels, related to a wagering game. Secondary display 114 may comprise similar or different display types and may be operatively configured to display the basic wagering game and/or another game, such as a secondary game, bonus game, or progressive game or information about such games.

It should be understood that numerous other elements may exist and may be used in any number of combinations to create various forms of a gaming terminal. Further, one or more of the indicated features may be omitted or combined in accord with the present concepts.

Figure 2A:
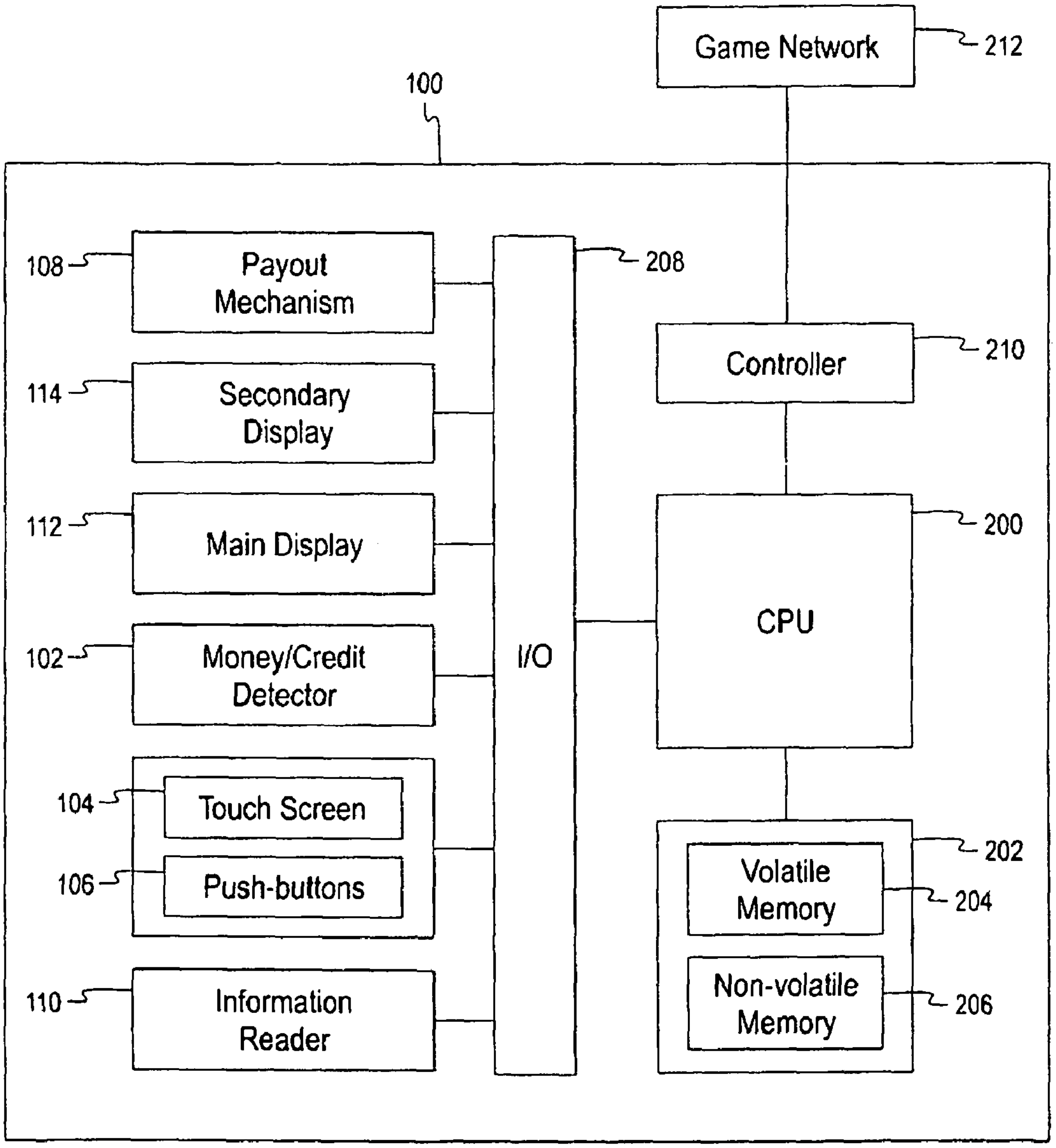
FIGS. 2(*a*)-2(*b*) respectively show a functional depiction of the gaming terminal shown in FIG. 1 and a group of wagering game terminals connected in a network in accord with one aspect of the present concepts.
Figure 2B:
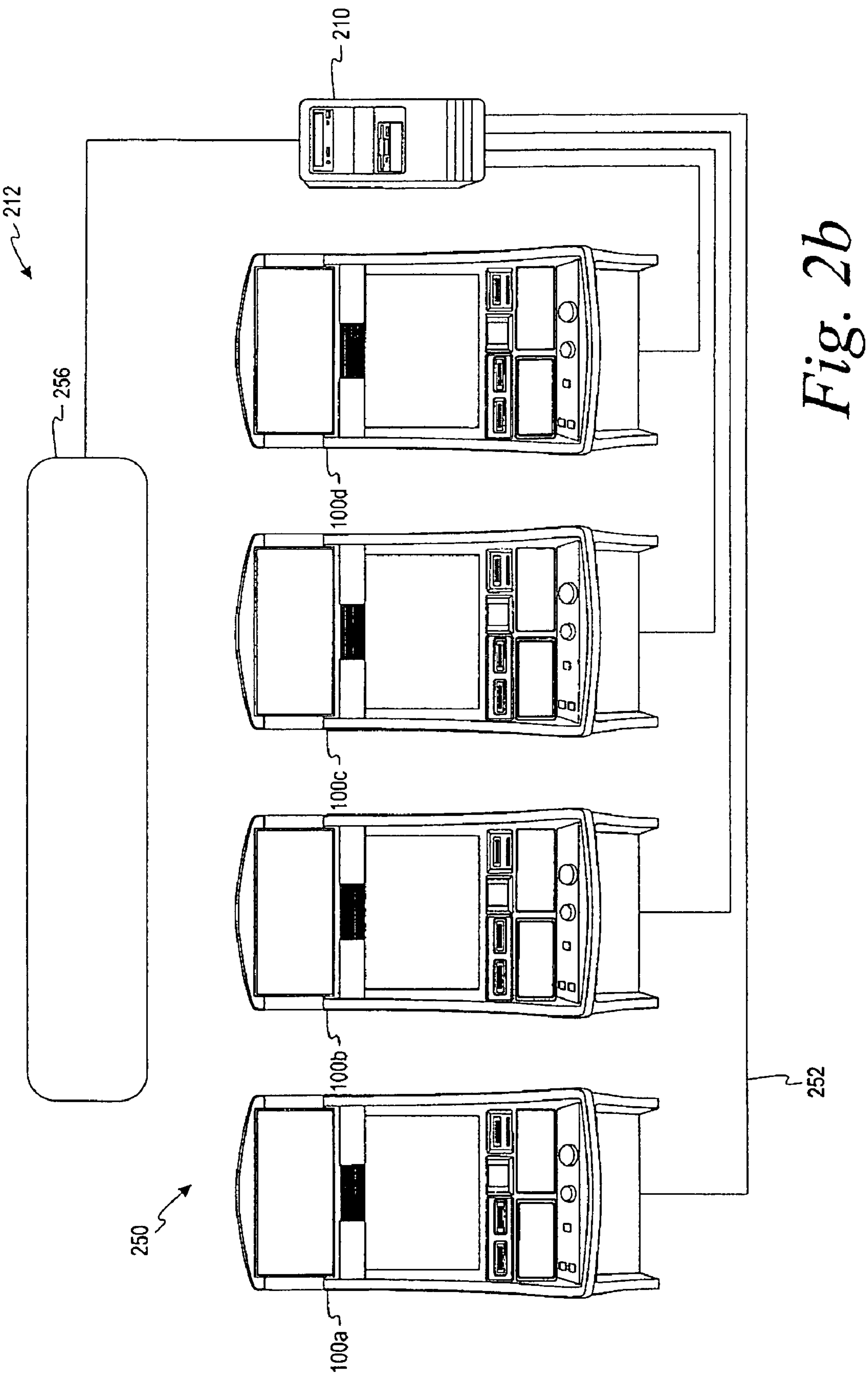

Gaming terminal 100 includes one or more processors, such as a central processing unit (CPU) 200, which executes one or more programs, routines, sub-routines and/or instruction sets, collectively referred to herein as a gaming control system, controlling play of the wagering game and any other games or functions associated therewith. These programs, routines, and/or instruction sets operate in combination with the CPU 200, or the like, to determine a random outcome for and to control play of the wagering game and any other games or functions associated with the gaming terminal 100. The gaming terminal 100 may include, as shown in FIG. 2(*a*) a storage unit 202 that includes one or more volatile memories 204 (e.g., a random-access memory (RAM)) and/or non-volatile memories 206 (e.g., hard drive, optical drive, an EEPROM). The gaming terminal 100 and associated gaming control system is capable of locally executing and displaying various wagering games including, but not limited to, a slot machine game, a lottery game, a card game and other conventional types of terminal-level and networked or remote wagering games.

The gaming terminal 100 and associated gaming control system is capable of executing such wagering games through a controller 210. Controller 210, as used herein, comprises any combination of hardware, software, and/or firmware that may be disposed or resident inside and/or outside of a gaming terminal 100 or like machine which may communicate with and/or control the transfer of data between the gaming terminal and a bus, computer, processor, device, service and/or network. The network may include, but is not limited to a peer-to-peer, client/server, master/slave, star network, ring network, bus network, or other network architecture wherein at least one processing device (e.g., computer) is linked to at least one other processing device. The controller 210, as used herein, may comprise one or more controllers. In one implementation, each gaming terminal 100 comprises, or is connected to, a controller 210 enabling each gaming terminal to transmit and/or receive signals, preferably both, in a peer-to-peer arrangement. In another example, the controller 210 may be adapted to facilitate arrangement of one or more gaming terminals 100 in a client/server or centralized arrangement. In one aspect, shown in FIG. 2(*a*), the controller 210 comprises a NIU (Network Interface Unit) connecting the gaming terminal 100 via a conventional I/O port and communication path (e.g. serial, parallel, IR, RC, 10bT, etc.) to a network or service 212, which may include, for example, other gaming terminals connected together in a network. In another aspect, shown in FIG. 2(*b*), the controller 210 comprises a server connected to a plurality of gaming terminals 100*a-d.*

The aforementioned programs, routines, sub-routines and/or instruction sets may be embedded within firmware and/or stored in a memory device resident in the gaming terminal 100 or may be stored in or associated with hardware, firmware, memory devices and/or equipment separate from or remote from the gaming terminal(s) 100 and/or controller 210. These programs, routines, sub-routines and/or instruction sets may be executed in whole or in part by any combination of the CPU 200, or the like, resident within the gaming terminal 100 and/or an external processor or processors separate from or remote to the gaming terminal 100.

The gaming terminal 100 may be a stand-alone terminal, or it may be part of a network 212 that connects multiple gaming terminals 100 together in a peer-to-peer network, a client/server network, or other network architecture. FIG. 2(*b*) illustrates an example where the network 212 is a client/server network. The network 212 includes a group 250 of gaming terminals 100*a*, 100*b*, 100*c*, 100*d* connected via network connections 252 (e.g., Ethernet-TCP/IP) to a controller 210 which, in this example, comprises a server. The gaming terminals 100*a*-100*d*are similar to the gaming terminal 100 (FIG. 1) and allow players to play a basic, terminal-level wagering game and another game. Although four gaming terminals 100*a-d* are shown located in the general vicinity of one another in view of the area signage 256, the present concepts include groups 250 comprising a greater or a lesser number of gaming terminals disposed in any grouping, placement, or location(s).

In some aspects, one or more functions of the gaming terminals 100*a*-100*d* may reside on the controller 210 instead of, or in addition to, the gaming terminals 100*a*-100*d*. The controller 210 may then conduct the basic and/or bonus games (or portions thereof) for each of the gaming terminals 100*a*-100*d*connected to the network 212, including providing the input data and information needed to operate the basic and/or bonus games. In addition to the basic wagering game, the gaming terminals 100*a-d* also allow players to participate in another game, such as a group-game conducted by the controller 210.

Figure 3:
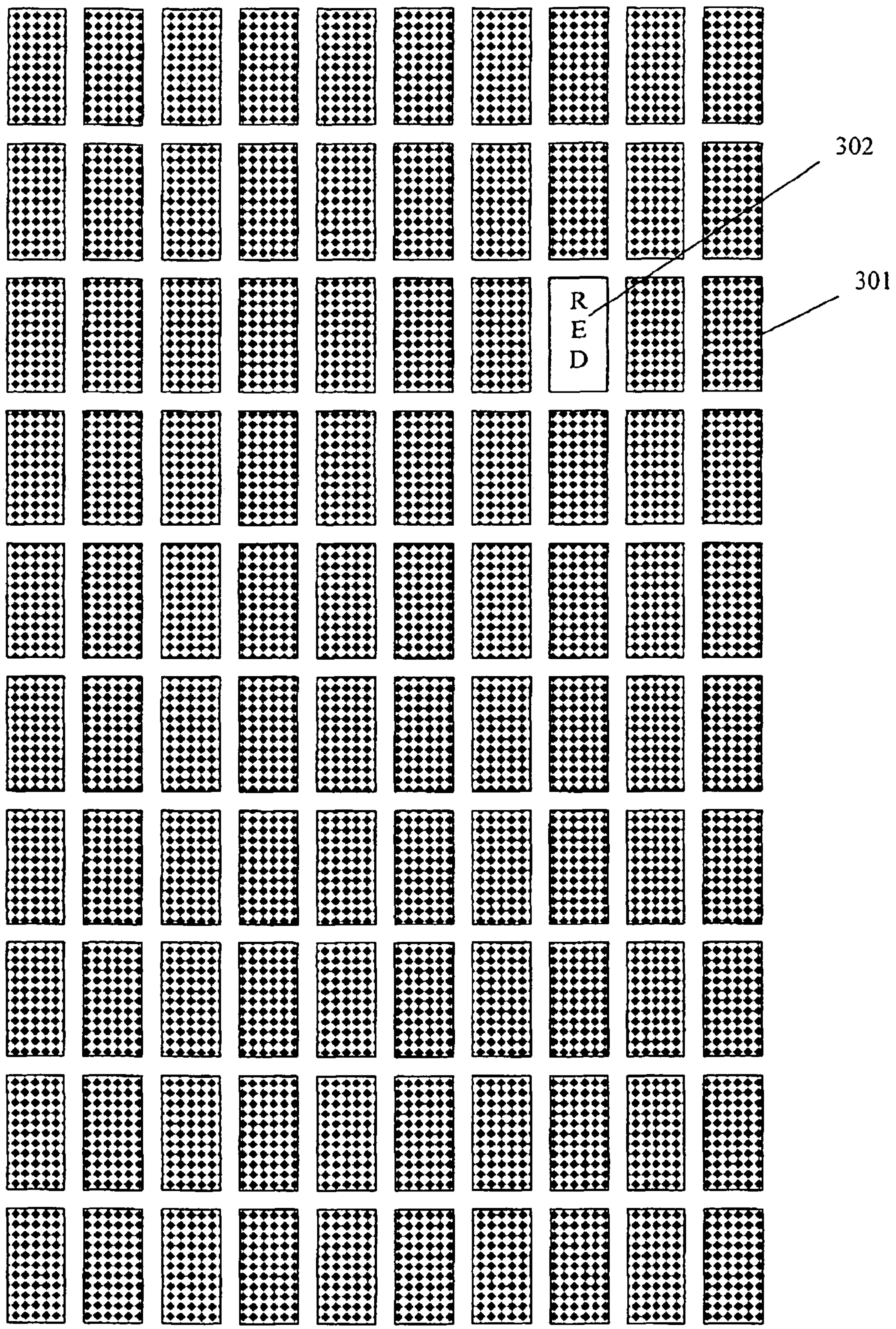
FIG. 3 shows an example of a gambling feature game in accord with the present concepts.
Figure 4:
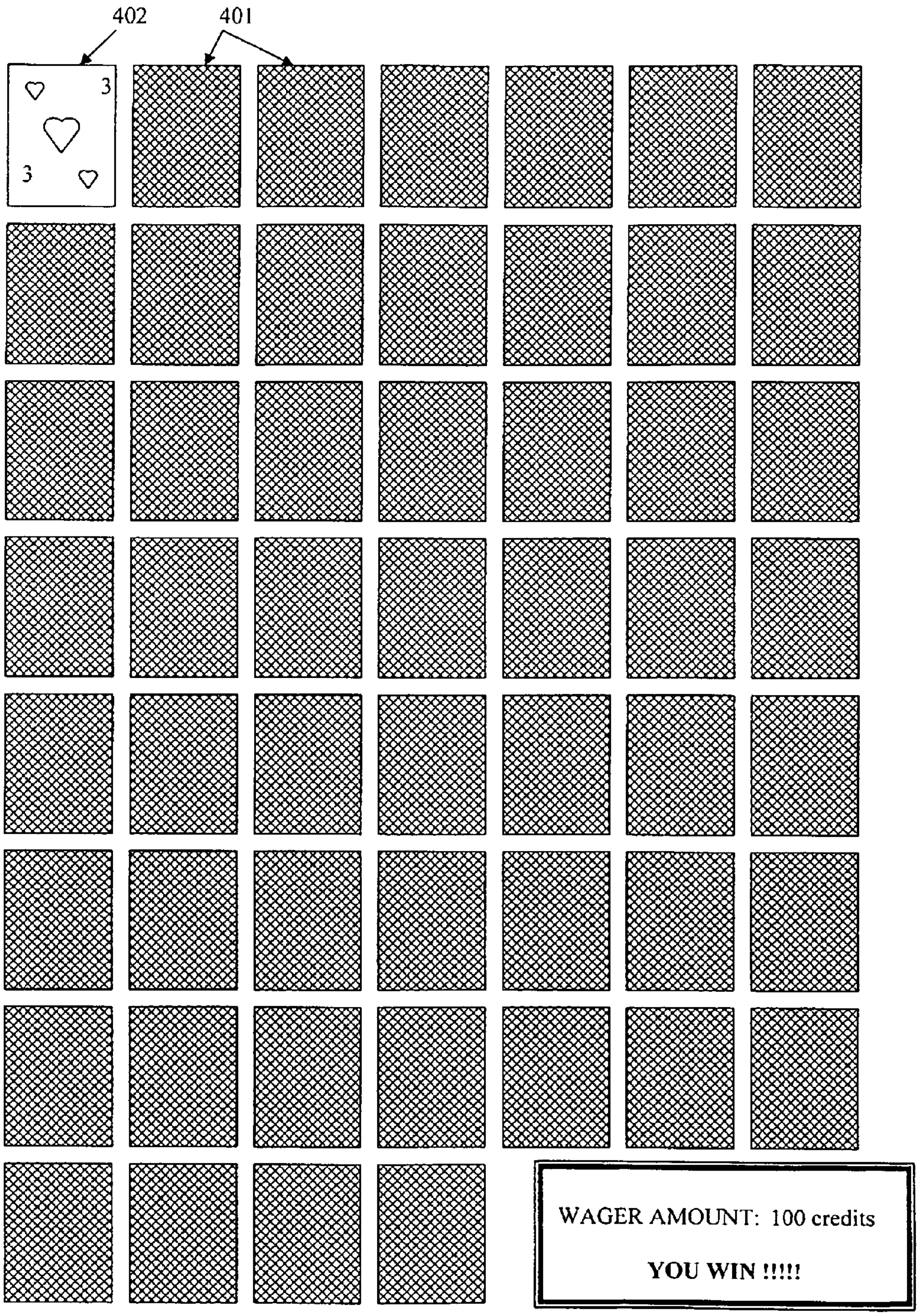
FIG. 4 shows an example of another gambling feature game in accord with the present concepts.

FIGS. 3-4 show representations of various screen displays illustrative of the present concepts. These representations are clearly basic in nature and are not intended to constitute any commercial embodiment of or limitation on the present concepts, but are merely presented to illustrate various concepts of game play in accord with the present concepts.

In a basic wagering game conducted at a gaming terminal 100, eligible players are awarded a prize (e.g., cash, credits, gifts certificates, etc.) outright, without any further requirement for participation. Other prizes may include entry into another game, such as a secondary game, bonus game, or progressive game, which provides further opportunity for an award, which is used generically herein to refer to any benefit bestowed upon a player regardless of terminology, form, and amount, and may optionally provide enhanced odds of attaining such award. The gaming terminal 100 basic wagering games are configured to provide, over a statistically significant period of time, a certain expected value (EV) to the house (e.g., casino) or to the player, based upon one's perspective. For example, a gaming terminal 100 basic wagering game may be configured to pay out to players thereof, over a statistically significant period of time, 92 cents for every dollar taken in. Other associated games, such as bonus games, are also conventionally configured to favor the house.

Generally, the present concepts include a wagering game incorporating a gambling feature with a high-payout percentage game in which a player is statistically more likely to win than to lose. The gambling feature would be enabled, for later activation upon some predetermined event in the basic game or some other event, or activated in response to an outcome in the wagering game comprising a start-gambling feature outcome. The start-gambling feature outcome could include, in one preferred aspect, any winning combination. In other aspects, the start-gambling feature outcome could comprise one or more selected winning combinations or, alternatively, one or more selected non-winning combinations. The term combination, as used herein, includes any event involving the occurrence of a single event or a combination of events. In a slot-machine implementation, for example, a single symbol appearing on a single reel along a pay-line would comprise a winning combination.

This gambling feature with a high-payout percentage game is not a bonus game, but rather a gambling feature that may be incorporated into any game, including a bonus game, or the like, to pay out better than 100% in certain aspects of game play over a statistically sufficient time period through balancing of the gambling feature odds of winning and/or the gambling feature payout. To be eligible for the gambling feature game, the player must either place an additional wager or side bet in the base wagering game, place an additional wager or side bet, when prompted, following a winning outcome in base wagering game, and/or wager at least a portion of an award for a winning combination in the base wagering game. The gambling feature game need not be immutable or continuous and may advantageously present one or more games having different potential outcomes, such as odds or risks which do not statistically benefit the player, provided that such one or more games, in combination, pay out better than 100% over a statistically sufficient time period.

Using the above example, the gaming terminal 100 basic wagering game may be configured to pay out to players thereof, over a statistically significant period of time, 90 or 91 cents for every dollar taken in. However, the gambling feature provides a greater than typical benefit to the player. The decreased pay out in the basic wagering game is applied to offset the pay-outs in the high-payout percentage game to still provide a net advantage, between the basic wagering game and the gambling feature with a high-payout percentage, to the house.

As one illustration of this concept, a player would be given the option to enter a gambling feature with a high-payout percentage game and gamble their winning in the basic or base wagering game (e.g., 25 credits) and, optionally, any separate wager or side bet placed prior to the communication to the player of a winning outcome in the base wagering game by the gaming terminal 100, following any winning outcome in a wagering game. In the example of FIG. 3, the player could be presented with 100 tiles 301 on a gaming display, such as main display 112 or secondary display 114, if the player elects to proceed with the gambling feature. The player would be prompted to pick one of the displayed tiles 301 using an appropriate I/O device, such as push-buttons 106 or a pointing device. Of the 100 tiles 301, 49 could be black and 51 could be red with the red tiles being designated as “winning” tiles. The selection of a winning tile 302 could result in a multiplier being applied to the winnings of the wagering game (e.g., a 2× multiplier), a supplemental winning added to the winning in the wagering game, or some other type of award. Following a pre-play reveal to demonstrate the playing field to the player and subsequent turning over and re-arrangement of the tiles 301, the player is allowed to pick a tile. Thus, the player wins if they pick a red tile 302, such as shown in FIG. 3. Under the stated distribution of red and black tiles, the player has a statistically greater chance of picking a red tile than a black tile. For every dollar or credit wagered in the gambling feature, the player enjoys an advantage over the house. Over a statistically significant time period, the gambling feature provides a pay out of over 100%, paying out more money than it takes in through the player’s loss of awards for winning combinations in the base wagering game and/or additional wagers or side bets.

In one implementation of this concept, the EV of a wagering game could be lowered somewhat to at least partially offset the increased volatility introduced by a gambling feature including a high-payout percentage game. When the player obtains a winning combination in the wagering game (i.e., a start-gambling feature outcome), which may include any winning combination, the player may be provided an option, via main display 112, secondary display 114, and/or other output device, to play a gambling feature having odds, outcomes, and/or awards favoring the player.

In another example, represented in FIG. 4, a player could be presented with a standard playing card deck having 52 suited cards 401 and, optionally, one or two jokers. All cards 401 of a selected color (red/black) would be designated, by either the player or the CPU 200 and/or controller 210, as a winning card. One potential variant could include designation of two of the four suits as winning cards. The joker(s) or similar wild-card could also be designated as a winning card to bias the odds of winning in the player’s favor.

In the example of FIG. 4, the red cards have been designated as winning cards and the player has drawn or selected the three of hearts card 402, which is a winning card. If the player picks a winning card, the player’s winnings from the winning combination in the wagering game, and any additional wagers or side bets, would be multiplied by an arbitrary multiplier and/or supplemented by a fixed-value award. The award for selecting a winning card may optionally include a fixed benefit, such as a fixed-value award. The player may even be presented with an option to select between a multiplier, a fixed-value award, a randomly selected fixed-value award, or other type of risk/reward pay out prior to or upon entry of the gambling feature.

For the winning subset of cards 401, one or more face cards of the selected winning colors may optionally provide a premium wherein a player’s winnings from the wagering game could be multiplied on a graded multiplier rather than a fixed multiplier. For example, in a scenario where a player has placed on the line his or her entire award or winning from the winning combination in the base wagering game, a 2× multiplier could be applied to an Ace, a 1.8× multiplier for a King, a 1.6× multiplier for a Queen, and/or a 1.4× multiplier for a Jack, with a lesser award (e.g., a 1.2× multiplier) for selection of another winning card that is not a face card. Selection of an incorrect card would result in the loss of the player’s wager corresponding to the gambling feature game. The aforementioned multipliers are arbitrary and intended to illustrate a potential implementation of the concepts, but are not intended to be limiting in any aspect. In still another aspect, the multipliers could be adjusted up or down in correspondence with the amount and/or level (i.e., percentage of award from base wagering game risked by player in gambling feature game) of the bet. For example, a lesser multiplier than that noted above could be provided when the player opts to wager an amount less than the full entire award or winning from the winning combination in the base wagering game.

Upon selection of a losing card, play returns to the basic wagering game. If the player picks a winning card, the player’s winnings from the winning combination in the wagering game would be multiplied by the appropriate multiplier and/or supplemented by a fixed-value award and play returns to the wagering game. The player may optionally be allowed to continue selecting cards 401 until a losing card is drawn or until the player unilaterally elects to terminate play of the gambling feature. The option to unilaterally terminate play of the gambling feature may be optionally offered only after the player has played one turn of the gambling feature.

In another aspect of the above card game, a player’s picking or drawing of a card 401 of a non-selected color results in the application of a fractional or negative multiplier to the award from the winning combination in the wagering game. The joker(s), or similar wild card(s), may be used to bias the odds of a player selecting a winning card in the player’s favor while keeping equal the potential award for a winning selection and the potential loss for a losing selection. The joker(s), or similar wild card(s), may alternatively be removed from the deck to even the odds of a player selecting one color of card (e.g., red) or the other color of card (e.g., black) and the positive multiplier or award paid out to the player upon a winning selection be adjusted to be slightly higher than the negative multiplier or award associated with a losing selection. Since the pay out is statistically biased in favor of the player, the pay out of the game will exceed 100% over time.

In still another example, the gambling feature may comprise a coin flip having even odds of the coin coming up as a “heads” or a “tails” with the “heads” constituting a win and a “tails” constituting a loss. While this provide a statistically balanced event (i.e., a 50/50 chance of either event), the pay out of the gambling feature may be adjusted to provide a better than 100% pay out over time. For example, each winning outcome in a wagering game may case a pop-up window to display a coin-flip screen. The player is prompted to flip the coin or, in lieu of an input, the gambling feature automatically flips the coin. Prior to or during the flip, the player is prompted to “call it” or select one of “heads” or “tails”.

In one aspect of the gambling feature coin flip game, the player may not receive a payout for a win, or suffer a detriment for a loss, but the winning event in the gambling feature could be tallied such that after a predetermined number of coin flips (e.g., 9), the player's $10^{th}$ play of the gambling feature is a "no-lose" game wherein a player's selection of a winning "heads" or "tails" outcome will be a win paying out 3.0× the pay out of the winning outcome in the wagering game (i.e., a 3.0× multiplier) and a "losing" selection of the other one of "heads" or "tails" will still pay out some lesser multiplier of the winning outcome in the wagering game (e.g., a multiplier less than the winning outcome multiplier, such as 1.5×). A tally or counter may advantageously be displayed on the display 112, 114 during play of the wagering game to let the player know how many wins they have in the gambling feature as an incentive for continued play. In other aspects, predictability may be eliminated by making the "no-lose" occurrence in the gambling feature entirely random or may be marginalized by constraining the "no-lose" occurrence in the gambling feature within a broad range of outcomes (e.g., between 25-50 wins, after which occurrence the counter is reset). In another aspect, each win could entitle the player to a small multiplier of the winning outcome in the wagering game (e.g., 1.02×, 1.04×, 1.06×, 1.08×, 1.10×, etc.) and each loss would simply end the gambling feature and the player would receive the award from the winning outcome in the wagering game. These multipliers are arbitrary examples and are not intended to be limiting in any respect.

It may be necessary to limit the number of times that the better than 100% pay out could be offered to the player. For example, the gambling feature may only intermittently offer a game providing a better than 100% pay out, alternating such game with one or more other games having odds and payouts providing parity between the player and the house or favoring the house. In one aspect, the gambling feature is enabled or activated upon the occurrence of any winning combination in the base wagering game, but the gambling feature game providing a better than 100% pay out is only intermittently offered. For example, the gambling feature may be enabled or provided for, on average, one out of every 5, 10, 20, 50 or 100, or any other suitable number of occurrences of any winning combination. The enabling or providing of this intermittent gambling feature may be randomly provided within a selected interval. For example, the gambling feature may be require a specified number of winning combinations in the players base wagering game (e.g., 50 winning combinations of any type) as a triggering event for a random better than 100% pay out within any one of the next specified number of plays of the gambling feature (e.g., within 50 additional plays of the gambling feature).

In another example, the gambling feature or associated controller, presents on a display (e.g., main display 112 or secondary display 114) a conventional 36-number single-zero or double-zero roulette wheel. The player is prompted to select a color, red or black, and the player is informed as to whether or not the gambling feature game to be played is a game that will pay out better than 100%. If the game is a game that will pay out better than 100%, the player is notified that the green number or numbers (0 and/or 00) will also constitute a "win" in the gambling feature, which bias the odds of winning in favor of the player. As with the aforementioned example, this gambling feature game paying out better than 100% may be advantageously alternated with one or more games wherein the odds and/or payouts provide parity between the player and the house (e.g., roulette with no green number) or favoring the house (e.g., roulette with green number(s) constituting a win for the house).

Another variant of the above-noted concepts includes a gambling feature which incorporates a skill-based element. One example of a skill-based game includes card games such as blackjack or poker and variants thereof. Conventional blackjack odds slightly favor the house and are influenced by the skill and play of the players, as well as the number of decks of cards used by the dealer, and the particular rules of the game. The rules and number of decks of cards may be varied, for example, to adjust the odds toward the house or toward the player. Other variables may include the introduction of wildcards. As one example, use of a single card deck biases the odds in favor of the player, whereas a six-deck stack biases the odds in favor of the house. Thus, to provide a gambling feature game that will pay out better than 100%, gambling feature game play variables may be adjusted so that at least some players, if not all players, will have a statistical advantage over the house. This may be done by selecting, for example, a set of variables wherein players of an average skill level applying basic strategy only generally or substantially-consistently will not receive a pay out better than 100%, whereas players with a higher than average skill level in which players substantially-consistently or consistently employ both basic strategy and more advanced techniques do receive a pay out better than 100%. In such aspect, the game play variables may be manipulated to produce a gambling feature game that will pay out better than 100% for a selected subset of the entire player population.

In another aspect, the gambling feature may comprise an automatic winning event which requires no additional player input within the gambling feature game. In this aspect of the gambling feature, a player is notified that they have received an award, which may comprise an award multiplier to the winning combination of the wagering game or a supplement to such reward. This automatic winning event may occur randomly or may occur randomly within specific limits such as, but not limited to, one automatic winning event per predetermined interval (e.g., 50 or 100 games). This may be an independent gambling feature or may be incorporated into any of the aforementioned gambling features.

The player may also be presented with a plurality of options and/or settings to enable gambling features that interest the player. For example, a player may be prompted to select from a random gambling feature, a chance-based gambling feature, skill-based gambling feature, automatic winning event, or any other suitable gambling feature having a game that will pay out better than 100%, either continuously, intermittently, or randomly. Within the selecting gambling feature, such as a chance-based gambling feature, the player may be provided a plurality of chance-based games (e.g., coin-flip, cards, tiles, roulette, etc.) to select on an individual (one-game) or global (multi-game) basis. In this manner, each player may be provided the opportunity to tailor their gambling experience to suit their particular interests.

In accord with the above-noted aspects, a gaming system for playing a wagering game is provided which includes an input device adapted to receive a first input from a player of the wagering game, a wagering game for presenting a randomly selected game outcome, and a gambling feature incorporating a game in which a player is statistically more likely to win than to lose, wherein the gambling feature is enabled by a winning combination, preferably any winning combination, in the wagering game.

While the present invention has been described with reference to one or more particular embodiments, those skilled in the art will recognize that many changes may be made thereto without departing from the spirit and scope of the present concepts. Each of these embodiments and obvious variations thereof is contemplated as falling within the spirit and scope of the claimed invention, which is set forth in the following claims.

What is claimed is:

1. A gaming system for playing a wagering game, comprising:

an input device adapted to receive an input from a player of a base wagering game, the input comprising an input of a first wager to play a base wagering game and a second wager specifically dedicated to the enabling of a gambling feature, and output a signal to a processor corresponding to the input from the player;

a processor configured to randomly select a base wagering game outcome from a plurality of base wagering game outcomes; and a gambling feature incorporating a game statistically biased in favor of the player such that the pay out of the gambling feature will exceed 100% over a statistically significant time period, said gambling feature being enabled in response to input of the second wager and said base wagering game outcome being a start-gambling feature outcome.

2. The gaming system of claim 1, wherein said start-gambling feature outcome comprises a winning outcome in said base wagering game.

3. The gaming system of claim 1, wherein the gambling feature is activated at the option of the player following the enabling of the gambling feature by the wagering game outcome comprising a winning outcome.

4. The gaming system of claim 1, wherein the gambling feature comprises a selection-based game or a chance-based game.

5. The gaming system of claim 1, wherein the statistically significant time period comprises a cycle of the base wagering game.

6. The gaming system of claim 1, wherein the gambling feature comprises a skill-based game.

7. The gaming system of claim 6, wherein the skill-based game comprises a card game.

8. The gaming system of claim 7, wherein the card game comprises a blackjack variant.

9. The gaming system of claim 1, wherein the allocation, by the player, of the second wager on an outcome of the gambling feature comprises allocation of at least a portion of an award for the winning outcome in the base wagering game.

10. The gaming system of claim 1, wherein the allocation, by the player, of the second wager on an outcome of the gambling feature comprises allocation of at least one of a side wager in the base wagering game and an additional wager subsequent to the winning outcome in the base wagering game.

11. A gaming system for playing a wagering game, comprising:

a gaming terminal including a wager acceptor for accepting an input of a first wager to play a wagering game and an input of a second wager to satisfy a first precondition for entry into a gambling feature and including a display for displaying the wagering game and a wagering game outcome responsive to an input of a first wager; and a processor associated with said gaming terminal and being configured to, upon execution of a corresponding instruction set, enable a gambling feature in response to satisfaction of the first precondition by the input of the second wager dedicated to enable the gambling feature and satisfaction of a second precondition comprising a realization of the wagering game outcome corresponding to a winning outcome;

define a plurality of possible outcomes of the gambling feature, the plurality of possible outcomes of the gambling feature being governed by an expected value requiring the pay out of the gambling feature to exceed 100% over a statistically significant time period;

present the gambling feature on the display for player input;

receive an input corresponding to the gambling feature by a player through a gaming terminal input device;

award to the player an award corresponding to the winning outcome in the wagering game; and supplement the award with any award realized by the player in the gambling feature.

12. The gaming system of claim 11, wherein said processor is further programmed to present each of the plurality of possible outcomes of the gambling feature on the display for selection of one of the plurality of possible outcomes by the player.

13. The gaming system of claim 11, wherein said processor is external to said gaming terminal.

14. The gaming system of claim 11, wherein said statistically significant time period comprises a cycle of the wagering game.

15. A method of playing a wagering game, comprising:

receiving a first wager for a wagering game and a second wager specifically dedicated to enable a gambling feature;

determining an outcome of the wagering game;

displaying on a display the outcome of the wagering game; and enabling a gambling feature only if the game outcome includes a start-gambling feature outcome and the second wager was received to enable the gambling feature, wherein the gambling feature comprises a game in which a player is statistically biased in favor of the player such that the pay out of the gambling feature will exceed 100% over a statistically significant time period.

16. The method of claim 15, wherein said statistically significant time period comprises a cycle of the wagering game.

17. The method of claim 15, further comprising:

presenting the player with an option to activate the gambling feature; and activating said gambling feature at the option of the player following a player input activating the gambling feature.

18. The method of claim 16, wherein said gambling feature comprises a selection-based game or a chance-based game.

19. The method of claim 16, further comprising reducing an expected value of the wagering game to offset an increased volatility introduced by the gambling feature.

20. The method of claim 16, wherein said gambling feature comprises a skill-based game.

21. The method of claim 16, wherein said skill-based game comprises a card game.

22. The method of claim 16, wherein said gambling feature incorporating a game in which a player is statistically more likely to win than to lose is presented to the player at least once during a predetermined interval.

23. A gaming terminal connected to a network for playing a base wagering game, comprising:

at least one display for displaying the base wagering game conducted at said gaming terminal; and a controller configured to conduct at least the base wagering game and a gambling feature game, wherein, in response to at least one winning combination at the gaming terminal during the base wagering game and an input of an additional wager specifically dedicated to enable the gambling feature game associated with the base wagering game, the controller initiates at the gaming terminal the gambling feature game having odds biased in favor of the player such that the pay out of gambling feature game will exceed 100% over a statistically significant time period.

24. A gaming terminal connected to a network for playing a base wagering game according to claim 23, wherein said gambling feature game having odds favoring the player of the gaming terminal is presented to the player once over a pre-selected interval, and wherein during a remainder of said pre-selected interval, in response to any winning combination at the gaming terminal during a base wagering game, a controller initiates at the gaming terminal the gambling feature game having odds that are neutral, over the statistically significant time period, between the player and the house or having odds that favor the house over the statistically significant time period.

25. A gaming terminal connected to a network for playing a base wagering game according to claim 24, wherein, in response to any winning combination at the gaming terminal during the base wagering game, the controller initiates at the gaming terminal the gambling feature game having odds biased in favor of the player such that the pay out of gambling feature game will exceed 100% over a statistically significant time period.

* * * * *